Figure 1:
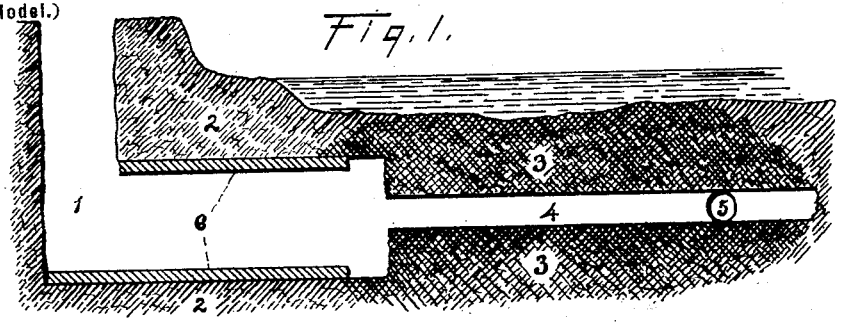

No. 711,012.  
C. SOOYSMITH.  
METHOD OF EXCAVATING AND CONSTRUCTING TUNNELS OR OTHER SUBTERRANEAN OR SUBMARINE STRUCTURES.  
(Application filed Jan. 29, 1902.)

Patented Oct. 14, 1902.

(No Model.)  
2 Sheets—Sheet 1.

WITNESSES:  
INVENTOR  
Charles Sooysmith  
by  
ATTORNEY

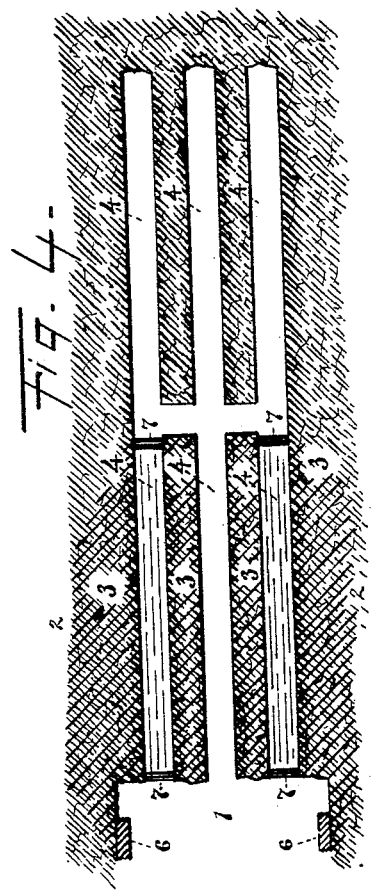
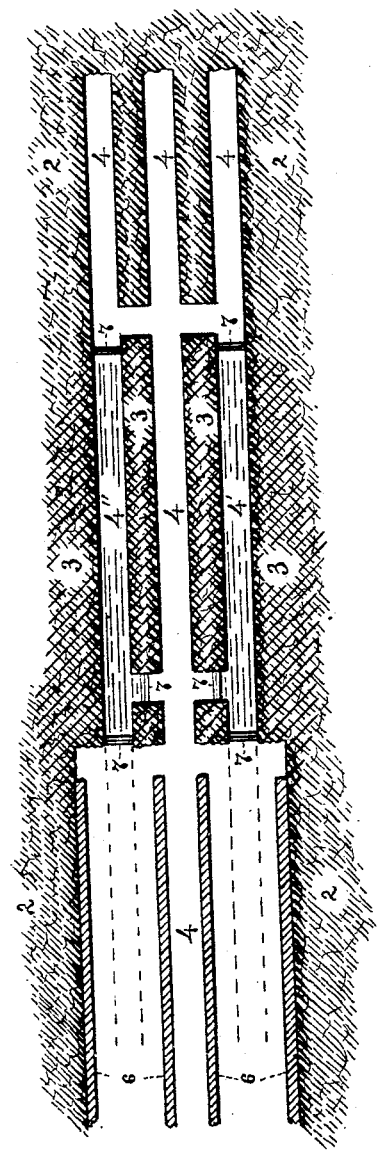

UNITED STATES PATENT OFFICE.

CHARLES SOOYSMITH, OF NEW YORK, N. Y.

METHOD OF EXCAVATING AND CONSTRUCTING TUNNELS OR OTHER SUBTERRANEAN OR SUBMARINE STRUCTURES.

SPECIFICATION forming part of Letters Patent No. 711,012, dated October 14, 1902.

Application filed January 29, 1902. Serial No. 91,672. (No specimens.)

*To all whom it may concern:*

Be it known that I, CHARLES SOOYSMITH, a citizen of the United States, and a resident of the city of New York, in the county of New York and State of New York, have invented certain new and useful Improvements in Methods of Excavating and Constructing Tunnels or other Subterranean or Submarine Structures, of which the following is a specification.

My invention relates to the process of constructing tunnels, shafts, or other excavations, and especially to tunnels or excavations in soft or yielding or water-bearing materials, and has more particular reference to those instances where the freezing method may be advantageously or necessarily employed.

The objects of my invention are to provide a practical method of excavation and construction which shall be at once economical, easy, rapid, safe, and stable. These objects I attain by the use of the process and devices illustrated in the accompanying drawings and described in the following specification and claimed specifically hereinafter.

In the drawings like figures of reference refer to like parts throughout the respective views.

Figure 2:
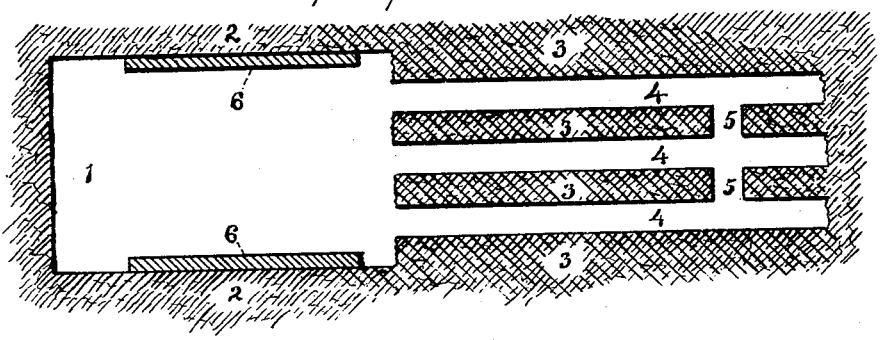
Figure 3:
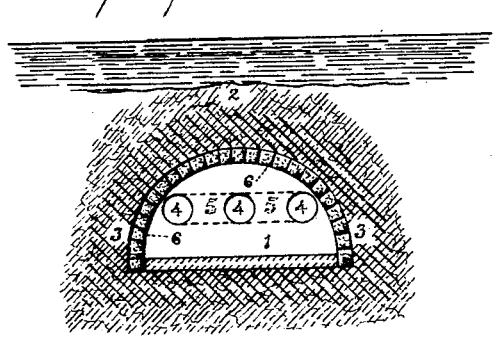

Figure 1 is a longitudinal sectional view of the heading of an excavation—as, for instance, the foot of a shaft or longitudinal tunnel—with pilot-tunnels extending ahead of the main excavation. Fig. 2 is a plan view of the same, showing three pilot-tunnels substantially side by side and preferably parallel, or nearly so, and a crossover or drift joining two or more of them. Fig. 3 is a cross-section of the tunnel or excavation, showing the three adjacent pilot-tunnels and crossovers. Fig. 4 is another plan view showing the headings of the pilot-tunnels advanced and a portion of one or more of them closed and used as a freezing-chamber. Fig. 5 is a similar plan view showing the process still further advanced and the main tunnels partially completed along the line of the two outside pilot-tunnels.

In my application for Letters Patent filed the 23d day of December, 1901, and serially numbered 86,946, series of 1900, I have shown a method of constructing tunnels by the use of a pilot-tunnel maintained in advance of the work of the main tunnel, and I have indicated therein a method of freezing the soft material, so as to solidify it and permit of its being excavated in a safe and practical way. I find, however, that it is a great advantage to have a plurality of these pilot-tunnels either all constructed at the same time or constructed as may seem advisable or convenient. Where a single pilot-tunnel is used, the devices employed for freezing the surrounding material may sometimes interfere with the progressive construction of the pilot-tunnel by obstructing the passage-way by which the material excavated at the heading is removed to the rear. By this invention I am enabled to introduce my freezing devices into portions of one or more of the pilot-tunnels and by the use of shields or partitions or otherwise confine the freezing effect to those portions, and by the construction and use of crossovers or drifts connecting and communicating with the various pilot-tunnels at such distances and points as may prove convenient or desirable I am enabled to continue the advancing and constructing of the pilot-tunnel and the removal of the excavated material without interfering with the freezing process going on in those portions of the pilot tunnel or tunnels not used as a means of ingress or egress to the headings of the same. I thus am able to work more freely, rapidly, and effectively, with a greater space or area for the freezing process. In the construction of this pilot-tunnel I may use the means and methods described in the application for patent above referred to or any other methods or means that may prove desirable.

Referring to the figures, 1 is the excavation or shaft; 2, the material in and through which the work is being carried on; 3, the frozen portion of this material; 4, the pilot-tunnel; 5, the crossover, connecting one or more of the pilot-tunnels.

In Figs. 3, 4, and 5, 4' and 4" are the outside pilot-tunnels, in which the shaded portions indicate that the freezing process is being employed. The unshaded portions indicate the unobstructed pilot-tunnels, in which the work of excavating and constructing is going on. In Figs. 1 and 5, 6 indicates the completed portion of the main tunnel or tunnels. I have not indicated the devices employed to accomplish these different steps of the process, as they are already sufficiently described and illustrated in my application before mentioned, and I do not desire to claim them specifically herein or limit myself to them or any of them.

The application or operation of my improved method is as follows: Having sunk a shaft or caisson, I commence a plurality of pilot-tunnels extending in the direction of the proposed main tunnels. These pilot-tunnels are preferably constructed at substantially equal intervals apart, their axes being substantially parallel and in the same horizontal plane, though these pilot-tunnels need not be in the same plane and may be above or below or on either side of the main tunnel. After continuing these to the proper distance I construct crossovers or drifts 5, connecting two or more of them so that communication may be maintained from one into the other for purposes of moving excavated material, ingress or egress to the headings, or for other purposes. After constructing the first crossover I introduce my freezing agents into that portion 4′ 4″ of one or more of these pilot-tunnels, preferably the outside ones, as indicated in Figs. 4 and 5, and by means of partitions 7 or otherwise I confine this action to those portions which may be therefore temporarily sealed up. I then continue the construction of the pilot-tunnels in advance of the drift or crossover 5, securing access to the heading therein by means of the central pilot-tunnel 4 and the crossovers or drifts connecting the plurality of tunnels at the advanced point. I may continue to do this indefinitely and may at the same time carry on the completion of the main tunnel or tunnels, following up the pilot-tunnels as fast as the surrounding material is sufficiently frozen to permit of its safe and convenient excavation and removal from the heading of the main tunnel or tunnels. It should be noted here that I may either construct a single tunnel, whose circumference may include the plurality of pilot-tunnels, or I may construct, as I have indicated in Fig. 5, two main tunnels side by side, or, as will be readily understood, I may construct as many main tunnels as there are pilot-tunnels, as this would simply require that the pilot-tunnels be placed at a sufficient distance apart to permit of the construction of the main tunnels without interference with each other, and I may then either fill up and close the crossovers or leave them, or some of them, preferably as a permanent means of communication between the main tunnels. Thus I am enabled to continue the process of advancing the pilot-tunnels, freezing the soil, removing the same, and constructing the main tunnel or tunnels simultaneously or consecutively and without delay or interference by one part of the process with another, by which time, labor, and capital can be conserved and economically expended.

I make no claim herein for the structure itself as produced by this method, as that is the subject-matter of the application for Letters Patent serially numbered 96,359, filed March 3, 1902.

I do not confine myself to any special number of pilot-tunnels or any special method of constructing the same or their location, as they may be above, below, or on either side of the main tunnel, nor to any absolute or fixed relation of any with the others, nor do I confine myself in the use of this process to any particular class of work, as submarine tunneling, or any particular direction, as the horizontal, nor do I limit myself to the employment of the freezing process as an element of my method, as I may carry on the work of excavation and other necessary or important operations from the pilot-tunnels without the use of a freezing process; but What I do claim, and desire to secure by Letters Patent, is—

1. The method of excavating which consists in, first, constructing a plurality of pilot-tunnels; second, establishing communication between the same; third, excavating the material surrounding the pilot-tunnels to the required line, substantially as described.

2. The method of forming excavations which consists in, first, advancing a plurality of pilot-tunnels; second, establishing communication between the same; third, introducing freezing agents into or through one or more of the pilot-tunnels; fourth, excavating the solidified material to the desired extent, substantially as described.

3. The method of excavating which consists in, first, advancing a plurality of pilot-tunnels; second, establishing communication between the same; third, freezing the material surrounding one or more of the same; fourth, advancing the pilot-tunnels beyond the frozen portions; fifth, excavating the frozen portions to the desired extent, substantially as described.

4. The method of excavating which consists in providing two or more pilot-tunnels with communicating passages, and removing the material about one or more of the same, substantially as described.

5. The method of constructing tunnels or similar structures which consists in, first, advancing a plurality of pilot-tunnels; second, establishing communication between the same; third, freezing the material surrounding one or more of the same but leaving at least one unobstructed; fourth, removing the frozen material to the desired extent; fifth, constructing the main tunnel or tunnels, substantially as described.

6. The method of excavating which consists in constructing two or more pilot-tunnels having communicating passages between them, and advancing one or more of the same simultaneously with the progress of excavation of the material surrounding them, substantially as described.

7. The method of excavating which consists in, first, constructing a plurality of pilot-tunnels; second, excavating the material surrounding a portion of the pilot-tunnels; third, establishing communication between the pilot-tunnels, substantially as described.

8. The method of excavating which consists in constructing two or more pilot-tunnels, having communicating passages between them, and freezing and excavating the surrounding material about the respective tunnels alternately, substantially as described.

9. The method of excavating which consists in, first, constructing a plurality of pilot-tunnels; second, excavating the material about one or more of the same; third, establishing communication between two or more of the same, substantially as described.

10. The method of excavating which consists in, first, constructing a plurality of pilot-tunnels; second, freezing the soil around one or more of the pilot-tunnels; third, excavating the solidified material to the desired extent, substantially as described.

11. The method of excavating which consists in, first, constructing a plurality of pilot-tunnels; second, establishing communication between the same; third, freezing the material surrounding one or more of the same, fourth, removing the frozen material substantially as described.

Signed at New York city, in the county of New York and State of New York, this 22d day of January, A. D. 1902.

CHARLES SOOYSMITH.

Witnesses:
THOMAS B. DALTON,
MINNIE E. WEINTZ.